United States Patent [19]

Dockery

[11] Patent Number: 4,809,359
[45] Date of Patent: Feb. 28, 1989

[54] SYSTEM FOR EXTENDING THE EFFECTIVE OPERATIONAL RANGE OF AN INFRARED REMOTE CONTROL SYSTEM

[76] Inventor: Devan T. Dockery, Rt. 8 Box 14, Defuniak Springs, Fla. 32433

[21] Appl. No.: 945,822

[22] Filed: Dec. 24, 1986

[51] Int. Cl.⁴ ............................................. H04B 9/00
[52] U.S. Cl. .................................. 455/603; 455/601; 455/617
[58] Field of Search ............... 455/602, 603, 601, 606, 455/607, 617

[56] References Cited

U.S. PATENT DOCUMENTS

| | | | |
|---|---|---|---|
| 3,513,443 | 5/1970 | Andersen | 455/603 |
| 4,149,186 | 4/1979 | Chung et al. | 358/83 |
| 4,259,746 | 3/1981 | Sandstedt | 455/617 |
| 4,264,982 | 4/1981 | Sakarya | 455/603 |
| 4,394,691 | 7/1983 | Amano et al. | 358/194.1 |
| 4,509,211 | 4/1985 | Robbins | 455/603 |
| 4,622,681 | 11/1986 | Snell et al. | 455/602 |
| 4,709,412 | 11/1987 | Seymour | 455/617 |

FOREIGN PATENT DOCUMENTS 3244712  6/1984  Fed. Rep. of Germany ...... 455/601

Primary Examiner—Robert L. Griffin
Assistant Examiner—L. Van Beer
Attorney, Agent, or Firm—Gifford, Groh, Sheridan, Sprinkle and Dolgorukov

[57] ABSTRACT

A system for extending the effective operational range of an infrared remote control system of the type having a remote control unit with an infrared transmitter and a controlled device having an infrared receiver. The system includes a first repeater positioned physically in the area where the remote contol unit will be used. An infrared receiver is contained within the first repeater and generates an electrical output signal representative of the infrared signal received from the remote control unit. A radio transmitter at the first repeater then transmits a radio signal to a radio receiver at a second repeater which is physically adjacent the controlled device(s). The radio receiver generates a second electrical signal representative of the received radio signal and this second electrical signal activates an infrared transmitter which transmits an infrared signal to the controlled device(s).

2 Claims, 1 Drawing Sheet

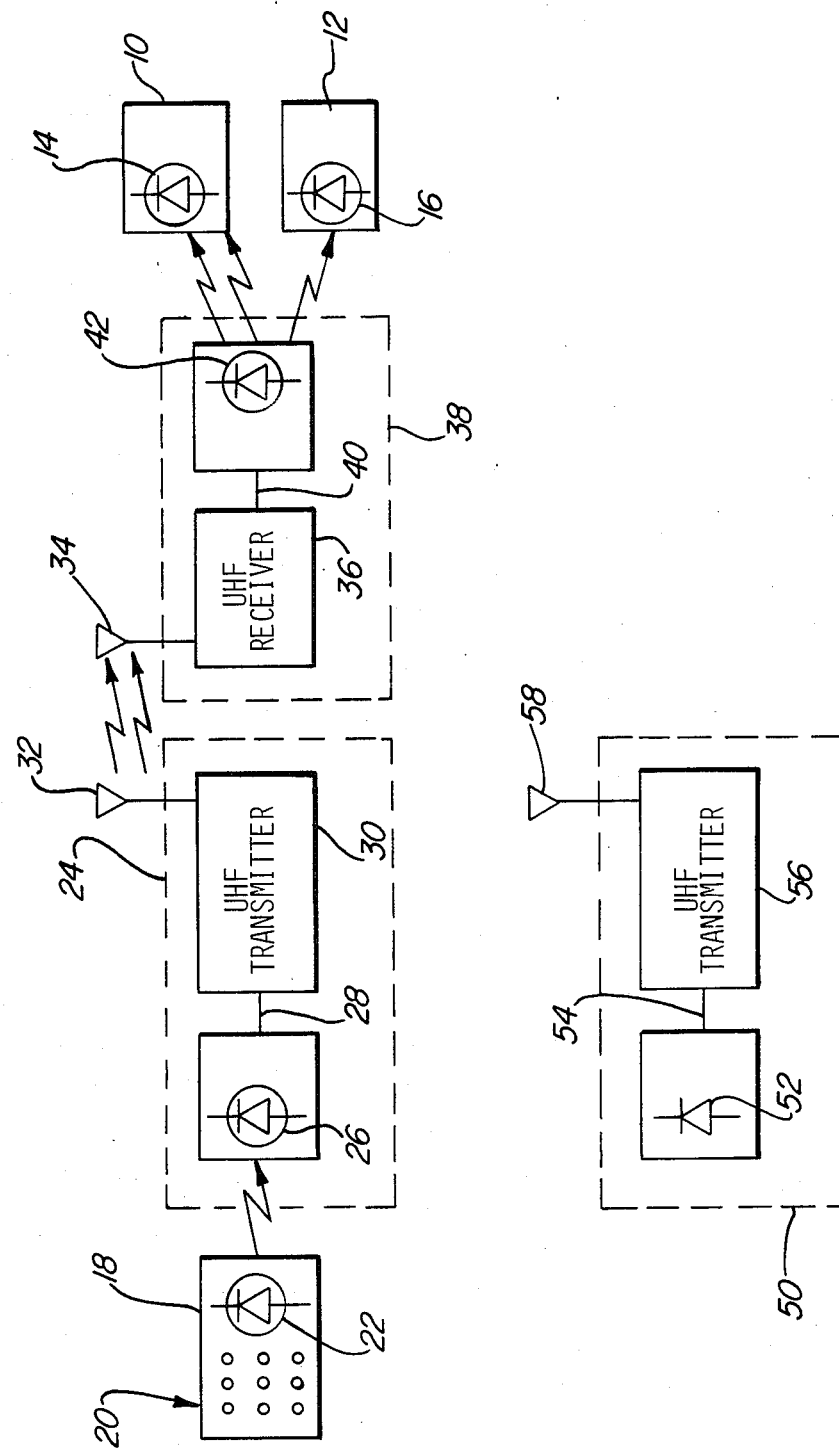

SYSTEM FOR EXTENDING THE EFFECTIVE OPERATIONAL RANGE OF AN INFRARED REMOTE CONTROL SYSTEM

BACKGROUND OF THE INVENTION

I. Field of the Invention

The present invention relates to a system for extending the effective operational range of an infrared remote control system of the type used with audio and video equipment.

II. Description of the Prior Art

There are many types of previously known remote controlled electronic devices which utilize an infrared signal between a remote control unit and the controlled device. Such types of previously known controlled devices include, for example, VCRs, television sets, audio amplifiers, and the like.

One disadvantage of these previously known infrared remote control systems is that the operational range of the remote control unit is limited to a line of sight path between the infrared transmitter at the remote control unit and the infrared receiver at the controlled device. In many instances, however, it is highly desirable to operate the controlled device from more than one room.

One previously known device for allowing the controlled device to be operated from more than one room is disclosed in U.S. Pat. No. 4,509,211 which issued on Apr. 7, 1985 to Robbins. In the Robbins patent the range for the infrared remote control system is effectively increased by utilizing a pair of transducer units which are electrically coupled together by a wire transmission line. This previously known system, however, is disadvantageous in several different respects.

First, in this previously known device, it is necessary to physically connect the transducer units together with a transmission line. In many cases, depending upon the location of the controlled device and the desired location of operation of the remote control unit, it is necessary to drill holes through walls, floors and the like in order to obtain the needed electrical connection.

A still further disadvantage of these previously known systems is that, if the control device is to be operated from two or more locations, a hard wire must be connected from each of the remote locations into the room containing the controlled device. Furthermore, a multiplexer circuit is required in order to electrically connect the multiple hard wire connections to the transducer unit adjacent the controlled device.

SUMMARY OF THE PRESENT INVENTION

The present invention provides a system for extending the effective operational range of an infrared remote control system which ovecomes all of the above mentioned disadvantages of the previously known devices.

In brief, the system of the present invention comprises a first repeater which is positioned near or adjacent the remote control unit and a second repeater which is positioned near or adjacent the controlled device. The first repeater can also be used with multi-room installations so that one first repeater would be positioned within each room.

The first repeater includes an infrared receiver which generates an electrical output signal representative of the signal received from the infrared transmitter in the remote control unit. A radio transmitter then receives this electrical signal and generates a radio signal representative of the electrical signal and thus representative of the received infrared signal from the remote control unit.

The second repeater, i.e. the repeater adjacent the controlled device, includes a radio receiver which receives the radio signal from the radio transmitter in the first repeater and converts the received radio signal into an electrical signal. This electronical signal then activates an infrared transmitter which transmits an infrared signal toward the controlled device or devices. Furthermore, since the second repeater can receive a radio signal from any room, there is no requirement for multiplexing multiple hard wire connections as with the previously known systems.

BRIEF DESCRIPTION OF THE DRAWING

A better understanding of the present invention will be had upon reference to the following detailed description when read in conjunction with the accompanying drawing which is a block diagrammatic view illustrating a preferred embodiment of the present invention.

DETAILED DESCRIPTION OF A PREFERRED EMBODIMENT OF THE PRESENT INVENTION

With reference to the drawing, a preferred embodiment of the present invention is thereshown and comprises one or more controlled devices 10 and 12, such as a video recorder, video disc player, stereo system components or the like. Furthermore, each controlled device 10 and 12 includes a photodetector 14 and 16, respectively, each of which is adapted to receive an infrared signal to control the operation of the controlled device 10 or 12.

A remote control unit 18 is typically used to control the operation of the controlled devices 10 and 12. The remote control unit 18 typically includes a key pad 20 which, when pressed, generates an infrared signal from an infrared emitter 22. As is well known in the art, an infrared remote control unit is a line of sight device, i.e. the remote control unit 18 must be within the line of sight of either photodetector 14 or 16 of the controlled devices 10 and 12, respectively, in order to operate them.

In order to overcome this limitation of the previously known infrared remote control systems, the present invention provides a system to extend the effective range of an infrared remote control system. As shown in the drawing, the system comprises a first repeater 24 having an infrared receiver or photodetector 26 which can be positioned in an area or room remote from the controlled devices 10 and 12. The photodetector 26 is responsive to the infrared signal from the remote control unit 18 and generates an electrical signal at its output 28 which is representative of the infrared signal from the remote control unit 18. This electrical signal on the output 28 is electrically connected as an input signal to an ultra high frequency (UHF) radio transmitter 30 which generates a radio signal from its antenna 32 which is representative of the infrared signal from the remote control unit 18.

The radio signal from the transmitter 30 is, in turn, received by the antenna 34 of an ultra high frequency receiver 36 at a second repeater 38. This second repeater 38 is positioned physically adjacent the controlled devices 10 and 12.

The radio receiver 36 generates an electrical signal on its output 40 which is representative of the received radio signal from the transmitter 30. This output signal 40 from the receiver 36 then activates an infrared emitter 42 which transmits an infrared signal to the photodetectors 14 and 16 respectively associated with the control units 10 and 12 to thereby control the operation of the controlled units 10 and 12 in the desired fashion.

Still referring to the drawing, additional repeaters 50 (only one additional repeater is illustrated in the drawing) can also be provided in different areas remote from the controlled devices 10 and 12. Each additional repeater 50 includes an infrared photodetector 52 which, like the photodetector 26, provides an electrical signal on its output 54 as an input signal to an ultra high frequency (UHF) transmitter 56. The transmitter 56, in turn, generates a radio signal from its antenna 58 which is received by the antenna 34 on the radio receiver 36 thus controlling the devices 10 and 12 in the previously described fashion. Any number of remote repeaters 50 can, of course, be employed without the need for multiplexing the receiver 36.

From the foregoing, it can be seen that the present invention provides a simple, inexpensive and yet wholly effective system for extending the effective operational range of an infrared remote control system.

Having described my intention, however, many modifications thereto will become apparent to those skilled in the art to which it pertains without deviation from the spirit of the invention as defined by the scope of the appended claims.

I claim:

1. A system for extending the effective operational range of one or more infrared remote control systems each having a remote control unit with an infrared transmitter and a controlled device having an infrared receiver remote from the infrared transmitter, said system comprising
    (a) a first repeater physically adjacent the remote control unit having
        (1) means for receiving said infrared signal and for generating an electrical signal representative thereof,
        (2) means responsive to said electrical signal for transmitting a radio signal representative of said electrical signal, and
    (b) a second repeater physically adjacent the controlled device having
        (1) means for receiving sadi radio signal and for generating an electrical signal representative thereof, and
        (2) means responsive to said electrical signal for transmitting an infrared signal representative thereof toward the controlled device;
    wherein said means for receiving said infrared signal comprises an infrared photodetector, and
    wherein said infrared transmitter comprises an infrared emitter.

2. The invention as defined in claim 1 and comprising at least two first repeaters, each first repeater being remote from said second repeater and also remote from each other, said first repeaters being substantially identical to each other.

* * * * *